(12) United States Patent
Hamilton

(10) Patent No.: US 8,061,750 B1
(45) Date of Patent: Nov. 22, 2011

(54) CARRY STRAP

(76) Inventor: Jeffery Hamilton, Eldridge, IA (US)

( * ) Notice: Subject to any disclaimer, the term of this patent is extended or adjusted under 35 U.S.C. 154(b) by 288 days.

(21) Appl. No.: 12/166,380

(22) Filed: Jul. 2, 2008

Related U.S. Application Data

(60) Provisional application No. 60/958,319, filed on Jul. 3, 2007.

(51) Int. Cl.
*B65G 7/12* (2006.01)
(52) U.S. Cl. .................. 294/149; 294/150; 294/165
(58) Field of Classification Search ............ 294/149, 294/150, 152, 164, 165, 74, 31.2, 147, 154, 294/156; 224/150, 609
See application file for complete search history.

(56) References Cited

U.S. PATENT DOCUMENTS

| | | | | |
|---|---|---|---|---|
| 1,405,052 A * | 1/1922 | Maher | | 294/74 |
| 3,046,045 A * | 7/1962 | Campbell | | 294/74 |
| 3,079,192 A * | 2/1963 | Otley | | 294/74 |
| 4,239,272 A * | 12/1980 | Corbett | | 294/74 |
| 4,737,069 A * | 4/1988 | Coblentz | | 414/802 |
| 4,867,359 A * | 9/1989 | Donovan | | 224/602 |
| 5,996,871 A * | 12/1999 | Maeng | | 224/645 |
| 6,089,636 A * | 7/2000 | Harris | | 294/150 |
| 6,142,547 A * | 11/2000 | Bowerman | | 294/150 |
| 6,331,024 B1 * | 12/2001 | Gulley | | 294/74 |
| 6,447,037 B1 * | 9/2002 | Crouch | | 294/149 |
| 6,457,762 B1 * | 10/2002 | Garutti | | 294/147 |
| 6,755,454 B1 * | 6/2004 | Cary | | 294/150 |

* cited by examiner

*Primary Examiner* — Dean Kramer
(74) *Attorney, Agent, or Firm* — Hamilton IP Law, PC.; Jay R. Hamilton; Charles A. Damschen

(57) ABSTRACT

A carry strap is disclosed. The carry strap includes an object engagement strap formed with a small loop on the object engagement strap first end, an end loop formed on the object engagement second end, and a handle. The end loop is configured so that it may pass through the small loop so that the object engagement strap forms an object loop for engagement with an object. The handle is affixed to the object engagement strap at handle connections. The carry strap may be engaged with objects of nearly any shape and size, depending on the specific embodiment of the carry strap. In an alternative embodiment, a rigid member may be affixed to a portion of the handle and/or end loop to increase comfort and ease of use.

3 Claims, 5 Drawing Sheets

CARRY STRAP

CROSS REFERENCE TO RELATED APPLICATIONS

Applicant claim priority under 35 U.S.C. §119(e) of provisional U.S. Patent Application Ser. No. 60/958,319 filed on Jul. 3, 2007, which is incorporated by reference herein.

FIELD OF INVENTION

The present invention relates to an apparatus for carrying objects, and more specifically to a flexible apparatus for carrying containers of various sizes and shapes.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

SUMMARY OF THE INVENTION

The present invention provides for an easy and inexpensive means for safely transporting objects of various sizes and shapes.

The carry strap includes a small loop, an end loop that may pass through the small loop, a handle, and an object engagement strap. The handle is affixed to the object engagement strap at handle connections, which may be any connection means known to those skilled in the art.

The object engagement strap is wrapped around the outer periphery of an object and the end loop is pulled through the small loop. Upon lifting of the end loop and handle, the object engagement strap is pulled tight against the object and the object is secured. The end loop creates a first contact point with the rim of the object, and the handle creates a second contact point and a third contact point with the object. With three contact points and the object engagement strap engaging the periphery of the object, the object is secured within the object loop of the carry strap.

The carry strap may be engaged with objects of nearly any shape and size, depending on the specific embodiment of the carry strap. The carry strap may be made as durable as the specific application dictates, and it may be made to withstand as large of load as the specific application dictates.

Though the embodiments shown in the figures included herein are directed towards applications involving a round planting pot, other embodiments are described and disclosed in the specification and the exemplary application as pictured herein and directed to planting pots in no way limits the scope of the present invention.

DETAILED DESCRIPTION - LISTING OF ELEMENTS

| ELEMENT DESCRIPTION | ELEMENT # |
| --- | --- |
| Carry Strap | 1 |
| Small Loop | 2 |
| End Loop | 3 |
| Handle | 4 |
| Object Engagement Strap | 5 |
| Handle Connection | 6 |
| Object | 7 |
| Object Loop | 8 |
| First Contact Point | 9 |
| Second Contact Point | 10 |
| Third Contact Point | 11 |

DETAILED DESCRIPTION

1. Exemplary Embodiment

Figure 1:
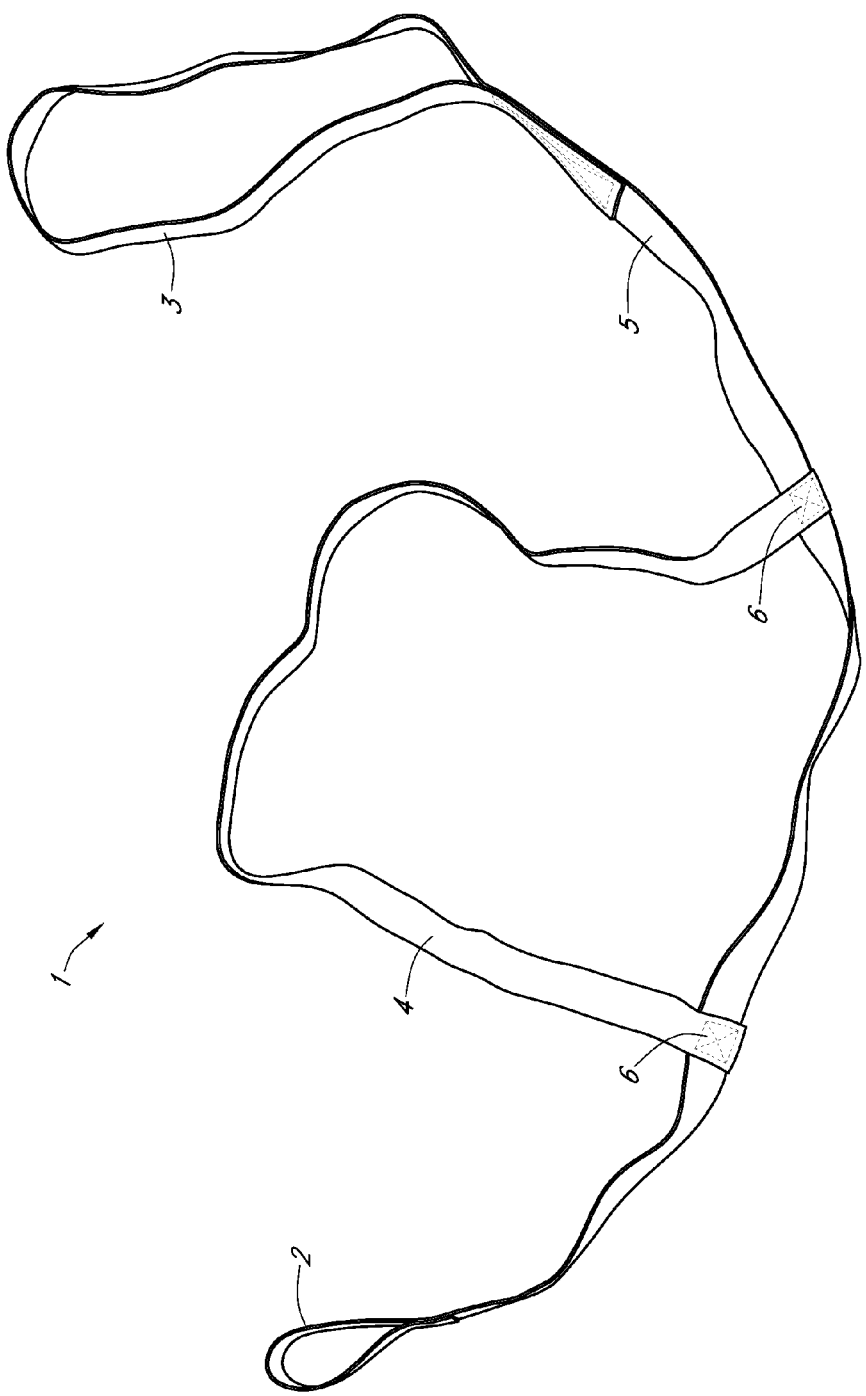
FIG. 1 provides a perspective view of one embodiment of the carry strap.
Figure 3:
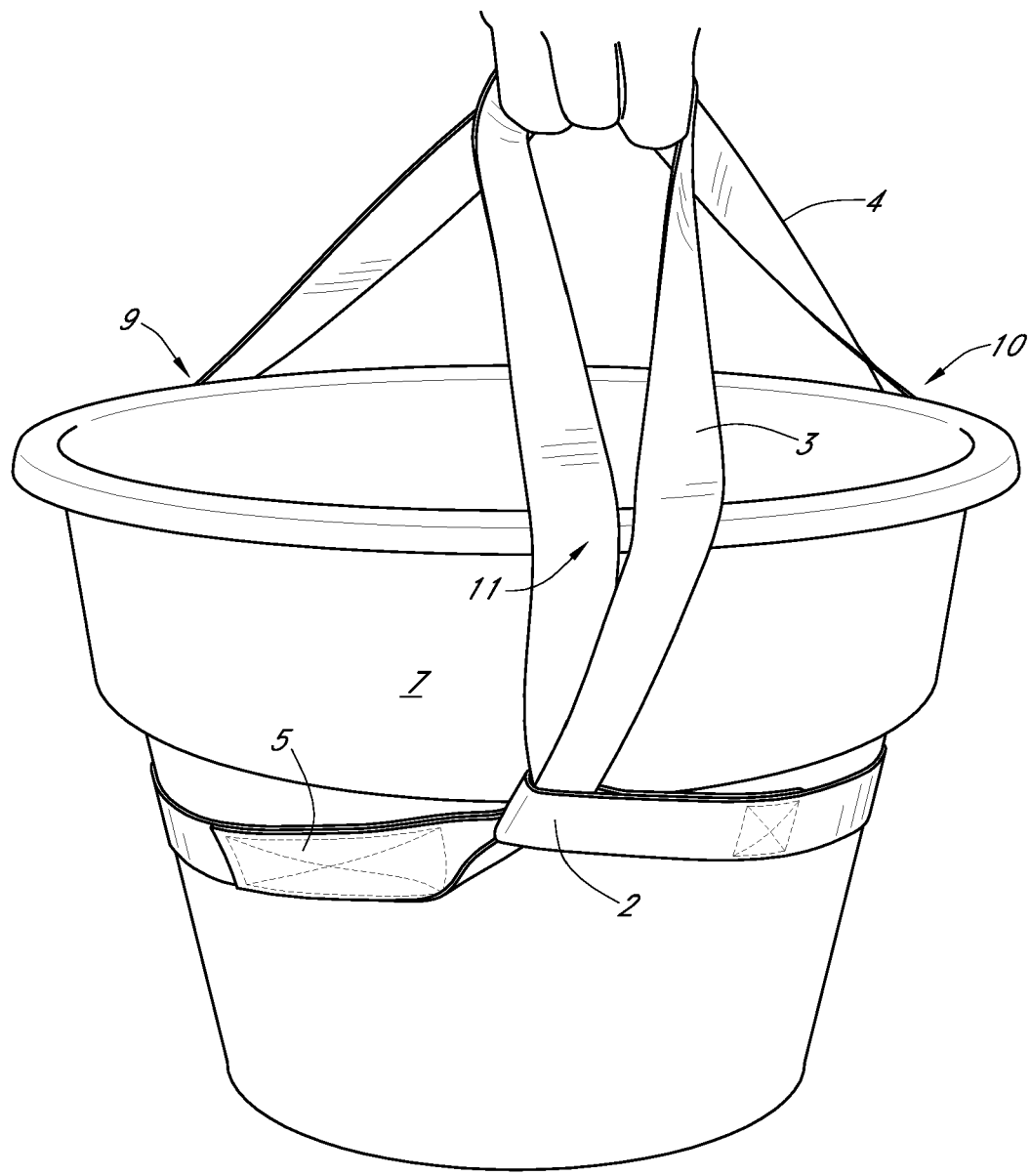
FIG. 3 provides a side view of one embodiment of the carry strap engaged with a planting pot.
Figure 4:
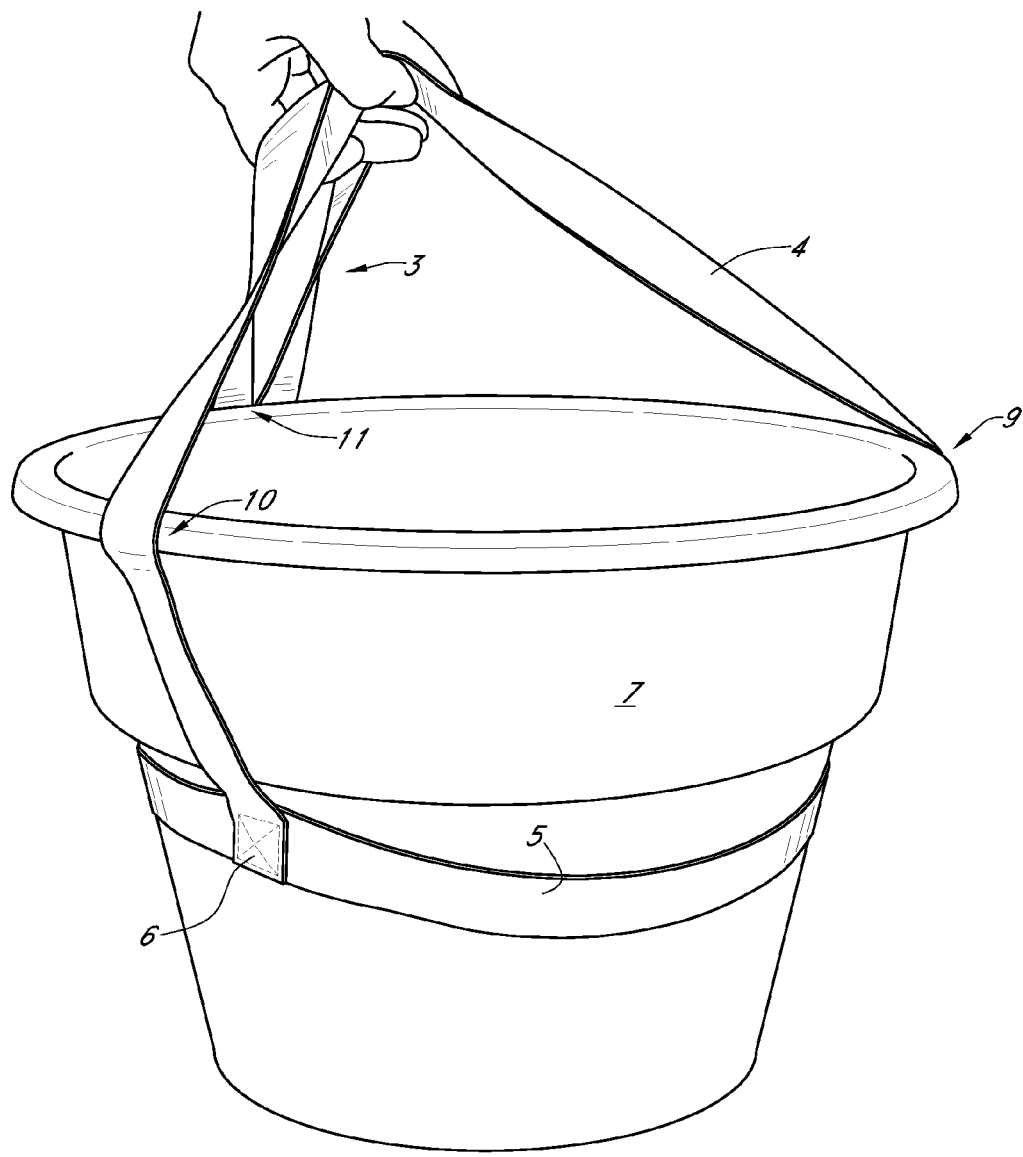
FIG. 4 provides a second side view of one embodiment of the carry strap engaged with a planting pot.
Figure 5:
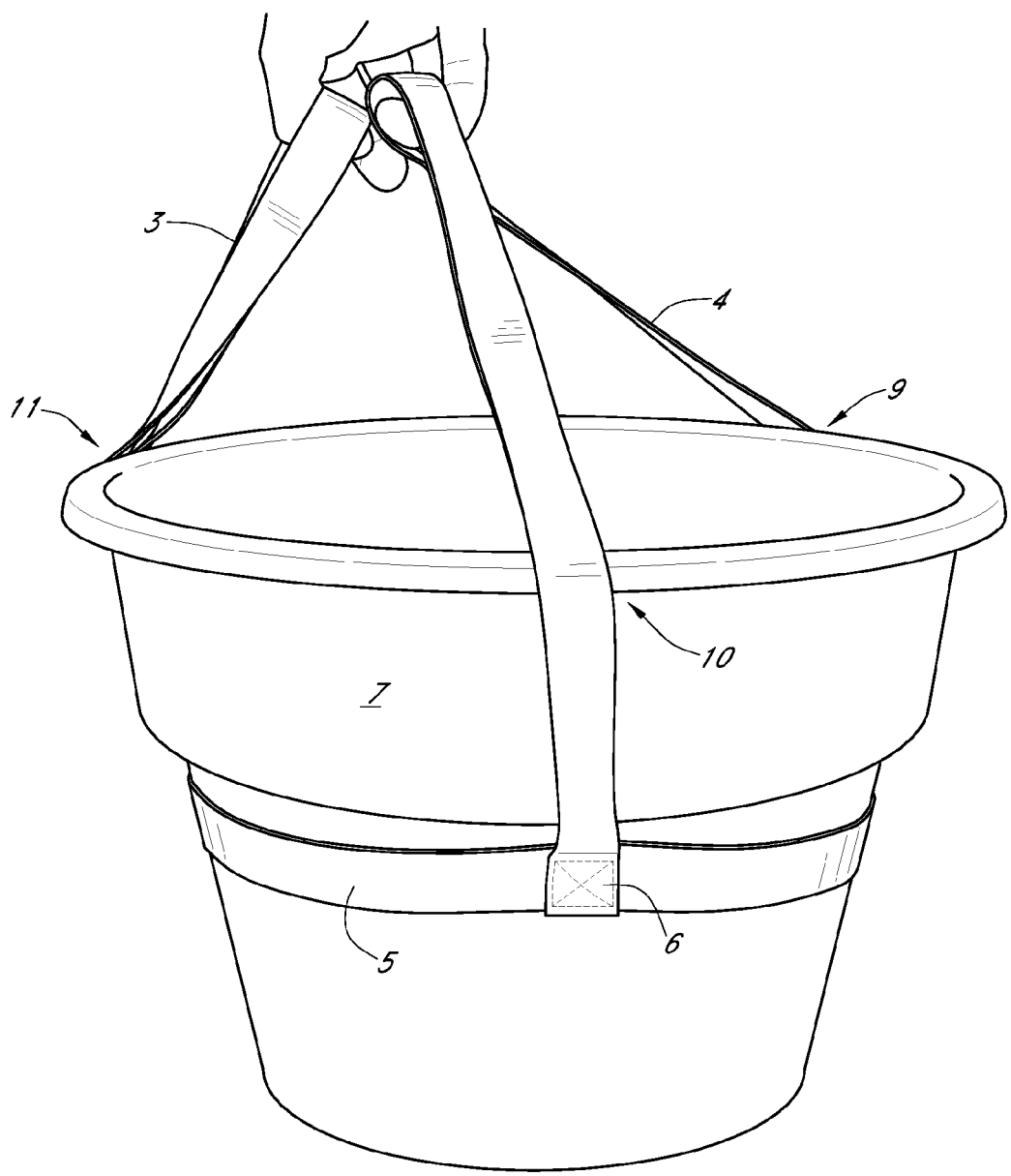
FIG. 5 provides a third side view of one embodiment of the carry strap engaged with a planting pot.

Referring now to the drawings, wherein like reference numerals designate identical or corresponding parts throughout the several views, FIG. 1 provides a perspective view of one embodiment of the carry strap 1 wherein the carry strap 1 is not engaged with an object 7 (object 7 shown in FIGS. 3-5).

In the embodiment as pictured herein, the carry strap 1 includes an object engagement strap 5, which is formed in a loop at each end. On its first end the object engagement strap 5 is formed into a small loop 2, and on its second end the object engagement strap 5 is formed into an end loop 3, as best shown in FIG. 1. Generally, the end loop 3 has a larger periphery than the small loop 2, but alternative embodiments exist in which the end loop 3 and small loop 2 have the same periphery, or in which the small loop 2 has a larger periphery than the end loop 3.

Affixed to the object engagement strap 5 at the handle connections 6 is a handle 4. The object engagement strap 5 (and the small loop 2 and end loop 3) and the handle 4 are made of a material that is sufficiently strong and flexible to accommodate the object 7 the user desires to transport with the carry strap 1. The handle connections 6 are also constructed to withstand a predetermined load on the carry strap 1. In the embodiments shown herein, the handle connections 6 are simply sewn thread, but the present disclosure includes any suitable means for connecting the handle 4 to the object engagement strap 5, as long as the means chosen are capable of withstanding the application to which the carry strap 1 is fashioned. For example, the handle connection could be a rivet or plurality of rivets, a thermo weld, a chemical adhesive, or any other suitable connection means known to those skilled in the art.

2. Exemplary Method of Use

Figure 2:
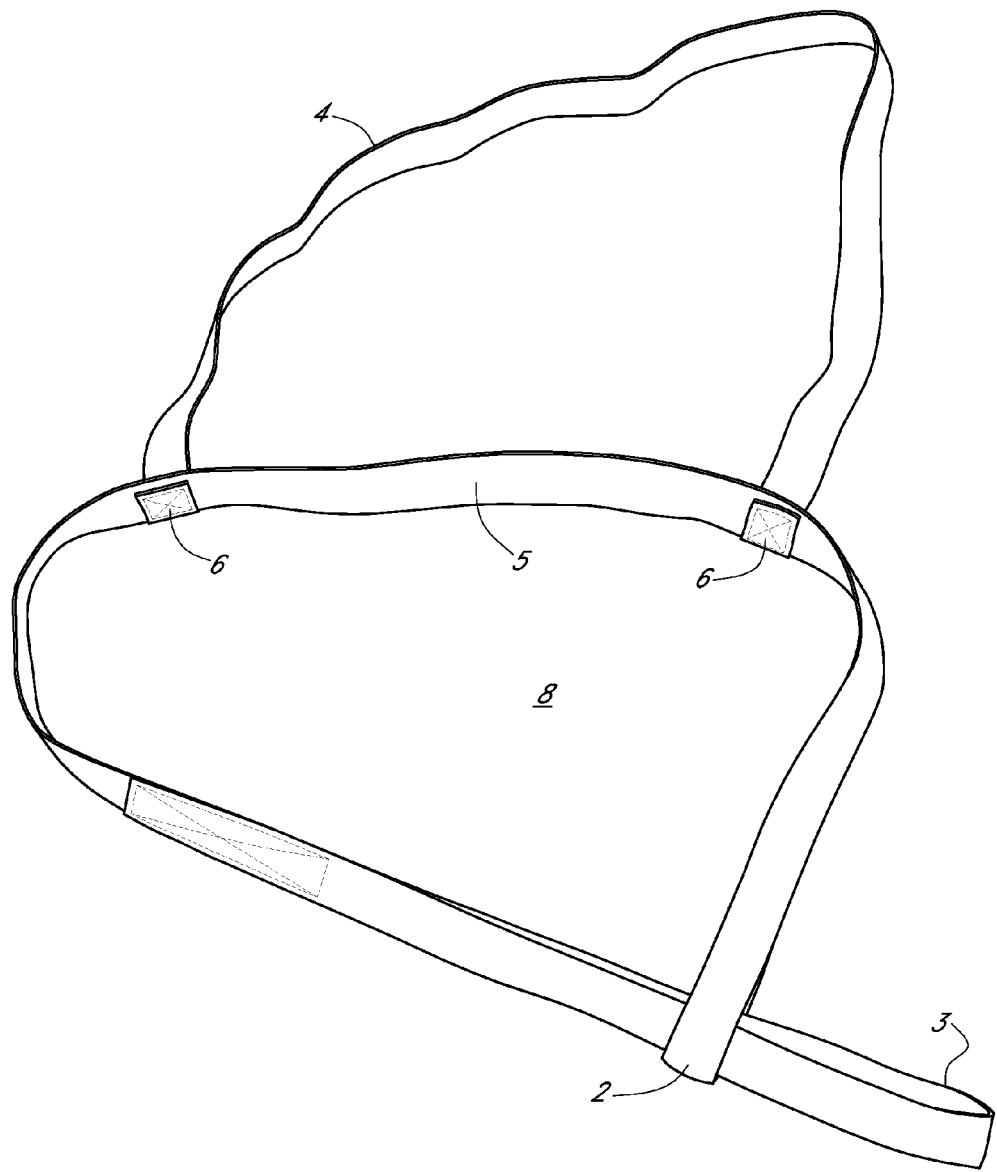
FIG. 2 provides a perspective view of one embodiment of the carry strap ready to be engaged with an object.

FIG. 2 shows the carry strap 1 positioned so that the carry strap 1 is ready to engage an object 7. The carry strap 1 may be removed or engaged with an object 7 without lifting or moving the object 7, which is an advantage compared to the prior art. The object 7 has been removed from FIG. 2 for purposes of clarity, but an object 7 is shown engaged with the carry strap 1 in FIGS. 3-5. To engage the carry strap 1 with an object 7, the object engagement strap 5 is first positioned around the periphery of the object 7. When the object engagement strap 5 is positioned around the periphery of the object 7, the object 7 is situated within the object loop 8. FIG. 2 shows the carry strap 1 positioned to form an object loop 8. To engage the carry strap 1 with an object 7, the object 7 would be oriented within the object loop 8. Passing the end loop 3 through the small loop 2, as shown in FIG. 2, forms the object loop 8.

After the object 7 is placed in the object loop 8, the user grasps the end loop 3 and the handle 4 and lifts up on both the handle 4 and the end loop 3 simultaneously. This causes the end loop 3 to pull through the small loop 2 until the object engagement strap 5 is fully engaged with the periphery of the object 7, as shown in FIGS. 3-5.

The handle 4 and the end loop 3 need not be brought in close proximity with one another (i.e., the orientation in which the handle 4 and the end loop 3 are shown in FIGS. 3-5) once the carry strap 1 is engaged with an object 7 in order for the object 7 to be securely held by the carry strap 1. If the object 7 is sufficiently bulky or heavy, two people may cooperate to use the carry strap 1. In a two-person operation, each person would be located on opposite sides of the object 7; it is contemplated that one person would lift at the end loop 3 and the other person would lift at the handle 4.

Whether used with one or two persons, the carry strap 1 securely holds the object 7. The object engagement strap 5 encompasses the entire outer periphery of the object 7 while the handle 4 provides a first contact point 9 and second contact point 10 with the object 7. The end loop 3 provides a third contact point 11 with the object 7. The three contact points 9, 10, 11 and the manner in which the object engagement strap 5 engages the periphery of the object 7 are best shown in FIGS. 3-5, wherein the carry strap 1 is shown engaged with an object 7 that is similar to a typical planting pot. The three contact points 9, 10, 11 provide for stability of the object 7 and prevent the object 7 from becoming offset to one side or the other, as an object 7 would be prone to do if the carrying device only engaged the object 7 with two contact points.

To remove the carry strap 1 from the object 7, the user simply releases the end loop 3 and pulls the handle 4. This causes the end loop 3 to exit the small loop 2, and causes the object engagement strap 5 to release from the periphery of the object 7 so that the object engagement strap 5 no longer forms the object loop 8, and the carry strap 1 returns to the orientation shown in FIG. 1.

Because the majority of the carry strap 1 may be made of a flexible material, the carry strap 1 may be engaged with objects 7 having an infinite number of different shapes, regardless of whether the object 7 has ridges on its outer periphery (such as the object 7 shown in FIGS. 3-5) and regardless of whether size of the object's 7 outer periphery is constant or tapered in one direction. In the exemplary embodiment pictured herein, the entire carry strap 1 is constructed of flexible material. However, as described for alternative embodiments, portions of the handle 4 and end loop 3 may be outfitted with rigid members (not shown) affixed thereto. However, even in such an alternative embodiment, the portion of the engagement strap 5 forming the object loop 8 would be made of material that is sufficiently flexible so that it could be engaged with objects 7 having many different shapes and sizes.

3. Alternative Embodiments

In an embodiment not shown herein, a rigid member (not shown) may be affixed to a portion of the end loop 3 to avoid the pinching effect on the user's hand caused by lifting the end loop 3 when the carry strap 1 is engaged with a heavy object 7. A rigid member (not shown) affixed to the end loop 3 would mitigate the pinching effect by keeping the end loop 3 in a spread position and provide for a comfortable gripping surface on the end loop 3. As long as the rigid member (not shown) was fashioned with a smaller outer periphery than the periphery of the small loop 2, the end loop 3 would still be able to pass through the small loop 2 to form the object loop 8. Similarly, in another embodiment not shown herein, a rigid member (not shown) may be affixed to a portion of the handle 4 to provide the same benefits as a rigid member (not shown) affixed to a portion of the end loop 3 as explained in detail above.

The carry strap 1 includes many alternative embodiments of varying size and strength. Depending on the application for which the carry strap 1 is designed, the object engagement strap 5, small loop 2, end loop 3, handle 4, and handle connections 6 may be able to withstand large forces. Alternatively, those elements may be fashioned of the most inexpensive materials available in the most inexpensive manner to facilitate carrying lighter objects 7. Accordingly, the size of the carry strap 1 or any elements thereof, the durability of the materials used to construct the carry strap 1, and the maximum load the carry strap 1 is designed to withstand in no way limit the scope of the present invention.

Any suitable material known to those skilled in the art may be used to construct the carry strap 1 or any portions thereof for any embodiment described or pictured herein. For example, man-made materials such as nylon, Kevlar, carbon fiber, polyester, polypropylene, any combination thereof, or other suitable materials may be used to construct the carry strap 1. Additionally, natural materials such as hemp, sisal, manila, cotton, any combination thereof, or other suitable natural materials may be used to construct the carry strap 1.

In embodiments employing a rigid member (not shown) affixed to a portion of the handle 4 and/or the end loop 3, the rigid member may be constructed of any material suitable for the specific application or range of applications for which the carry strap 1 is designed. For example, the rigid member (not shown) may be constructed of a synthetic material (polyvinyl chloride, poly-propylene, etc.), a natural material such as wood, steel, aluminum, any combination thereof, or any other suitable material known to those skilled in the art.

The carry strap 1 is not limited by the specific embodiments pictured or described herein, or the specific object 7 or range of objects that the carry strap 1 is fashioned to engage. Additionally, the scope of the present invention is not limited by whether the specific embodiment includes a rigid member on the end loop 3. The present invention is intended to apply to all similar apparatuses for transporting an object 7. Modifications and alterations from the described embodiments will occur to those skilled in the art without departure from the spirit and scope of the present invention.

The invention claimed is:

1. A method for carrying an object using an apparatus for carrying said object, said method comprising the steps of:
   a. positioning an object engagement strap of said apparatus around the periphery of an object to be carried, wherein a small loop is formed in a first end of said object engagement strap and an end loop is formed in a second end of said object engagement strap, wherein a handle is affixed to said object engagement strap between said end loop and said small loop at a first and second handle connection;

b. inserting said end loop through said small loop so that said object engagement strap forms an object loop around the periphery of said object;
c. grasping said handle and said end loop with at least one hand;
d. pulling upward on both said handle and said end loop to restrict said object loop until said object engagement strap securely engages said periphery of said object to be carried on at least three points around the periphery of said object to be carried.

2. The method according to claim 1 wherein said first and second handle connections are further defined as comprising sewn material.

3. The method according to claim 1 wherein said said first and second handle connections are further defined as comprising chemical adhesives.

* * * * *